United States Patent [19]

Clift et al.

[11] Patent Number: 4,682,619
[45] Date of Patent: Jul. 28, 1987

[54] REVERSE-BUCKLING RUPTURE DISK

[76] Inventors: Miner Clift; Bill Engelhardt, both of P.O. Box 1327, Broken Arrow, Okla. 74012

[21] Appl. No.: 851,441

[22] Filed: Apr. 14, 1986

Related U.S. Application Data

[63] Continuation of Ser. No. 510,568, Jul. 5, 1983, abandoned.

[51] Int. Cl.$^4$ ............................................. F16K 17/14
[52] U.S. Cl. .................................. 137/68.1; 220/89 A
[58] Field of Search ...................... 137/68.1; 220/89 A

[56] References Cited

U.S. PATENT DOCUMENTS

| | | | |
|---|---|---|---|
| 2,095,828 | 10/1937 | Nerad | 220/89 A |
| 2,225,220 | 12/1940 | Hutt | 137/68 R |
| 4,183,370 | 1/1980 | Adler | 137/68 R |
| 4,236,648 | 12/1980 | Wood | 220/89 A |

FOREIGN PATENT DOCUMENTS

| | | | |
|---|---|---|---|
| 233387 | 12/1968 | U.S.S.R. | 137/68 R |
| 832209 | 5/1981 | U.S.S.R. | 137/68 R |

Primary Examiner—Harold W. Weakley
Attorney, Agent, or Firm—Pravel, Gambrell, Hewitt, Kimball & Krieger

[57] ABSTRACT

A reverse-buckling rupture disk assembly provides a cylindrical housing having a bore for conveying flow through the housing. Mounted within the housing is a frangible concave-convex disk which is connected along its peripheral edge to the housing so as to form a closure to the bore. The disk is designed to resist pressure on the convex side up to a predetermined pressure and then collapsing after the predetermined pressure is reached. A knife blade is positioned within the housing bore on the concave side of the disk for perforating the disk when it collapses. The ends of the blade are connected to the inner surface of the housing or are connected on one side of the lateral center line of the bore. The knife blade is spaced from the inner surface of the housing at least along a substantial portion of its length. The knife blade can be serrated and is preferably curved. The blade can be generally U-shaped so that both ends of the knife blade are connected to the same half of the housing wall.

10 Claims, 4 Drawing Figures

U.S. Patent   Jul. 28, 1987   4,682,619
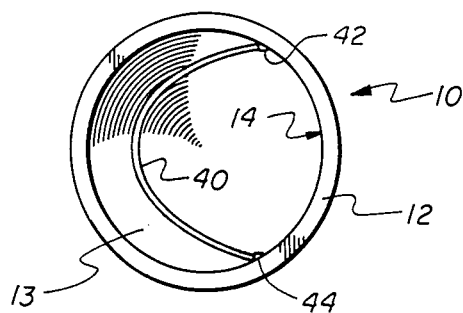
fig.1
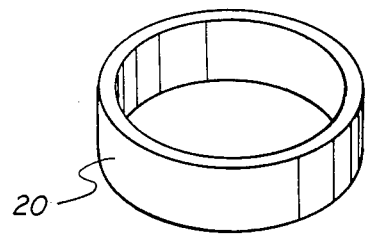
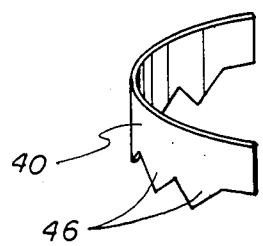
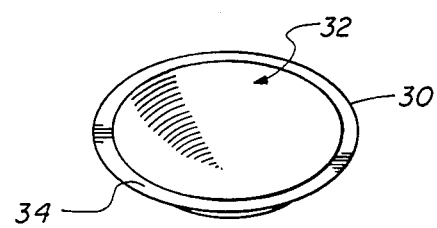
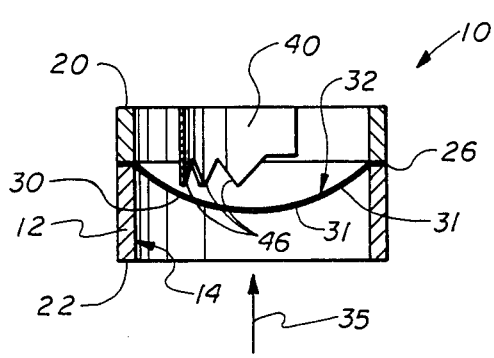
fig.2
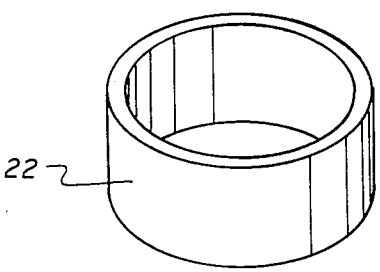
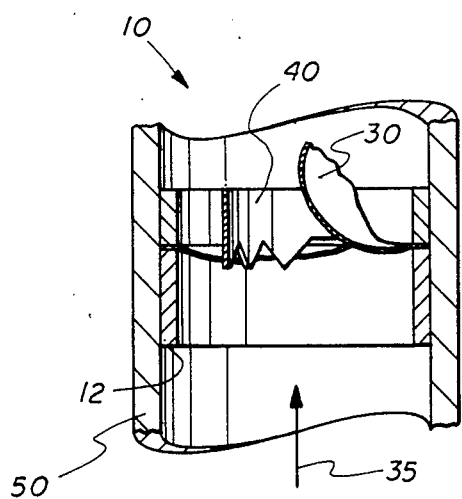
fig.3
fig.4

REVERSE-BUCKLING RUPTURE DISK

This is a continuation of application Ser. No. 510,568 filed July 5, 1983 entitled "Reverse-Buckling Rupture Disk", now abandoned.

BACKGROUND OF THE INVENTION

1. Technical Field.

The present invention relates to safety pressure relief devices and more particularly to rupture disks. Even more particularly, the present invention relates to reverse-buckling type rupture disks of the type using a reverse-buckling rupture disk in combination with a knife located adjacent the concave side of the rupture disk.

2. General Background

Various rupture disks have been patented of the reversebuckling type, which in combination with the disk use a cutting blade for severing the disk when the disk reverses and buckles in the presence of a design relief pressure. Notice, for example, recently issued U.S. Pat. No. 4,269,214 entitled "Safety Pressure Relief Valve" issued to Calvin C. Forsythe, John L. Strelow and Miner E. Clift, the latter being a co-inventor of the present application. In that application, there is discussed various prior reverse-buckling type rupture disks which have as part of the apparatus a cutting blade for severing a portion of the disk upon reversal. In that patent, there is provided a safety pressure relief device including a rupture disk having a concave-convex portion and a radially outer flange portion joined by a curved transition connection. A knife is located adjacent the concave side of the rupture disk, with the knife including a radially outer flange portion which supports the curved transition connection. A sustantially circular inner opening is disposed within the knife. The knife includes first and second spaced cutters projecting radially inward into the opening and inclined toward the concave portion of the rupture disk. The knife further includes first and second arcuate non-cutting portions each partially defining an inner opening. The first cutting blade is located between the first and second non-cutting portions so that upon reversal of the rupture disk, the first and second cutting means will puncture the rupture disk without severing a portion of the disk therefrom.

Another safety pressure relief apparatus of the reversebuckling type is U.S. Pat. No. 4,211,334 issued to John E. Witten, Loren E. Wood and Edward Short. That device provides a safety pressure relief apparatus having a reverse-buckling rupture disk which provides a concave-convex portion connected to an annular flat flange portion by a curved transition connection and a support member having an annular flat flange portion for engaging the annular flat flange portion of the rupture disk and for supporting the transition connection thereof. The support member includes a cutting edge positioned interiorly of the transition connection and forming an opening in the support member so that when the concave-convex portion of the rupture disk reverses itself, the cutting edge severs the disk whereby a portion thereof passes through the opening in the support member. A bar for catching the severed portion of the disk after it passes through the opening in the support member is attached to the support member.

Another reverse-buckling type rupture disk is seen in U.S. Pat. No. 3,908,684 issued to Edward Short. That device provides a rupture disk assembly of small integral construction comprising a substantially cylindrical housing having a reverse-buckling rupture disk supported therein. An annular top supporting member is positioned within the housing adjacent to the rupture disk, which includes an annular lip portion extending outwardly around the periphery thereof. The upper end portion of the housing is folded over the outwardly extending lip portion of the supporting member so that the lip portion is deformed downwardly thereby rigidly clamping the supporting member and rupture disk within the housing.

A low pressure rupture device is the suject of U.S. Pat. No. 4,119,236 issued to Kenneth R. Shaw and Franklin Hansen. That patent discloses a safe pressure relief assembly of the reverse acting rupture disk type which guards against very low pressure differentials and includes a thin, bulged sealing disk, a cutting member positioned in spaced relation to the sealing disk and extending a substantial transverse distance thereacross and a sealing disk support member having a stay arrangement projecting into supporting engagement with the concave side of the sealing disk, the stay arrangement having a resistance to collapse sufficient to retain the sealing disk out of contact with the cutting member only up to a predetermined differential pressure.

A precise, reverse acting, frangible disk pressure device is the subject of U.S. Pat. No. 3,685,686 issued to John H. Raidl. That device uses a frangible member sub-assembly having a pre-bulged frangible disk with its annular flange secured between first and second seating rings. The frangible disk sub-assembly and a co-acting knife blade sub-assembly are mounted in annular grooves on the mating faces of flanges. A particular feature is the supporting of the downstream disk seating ring against an annular seat on the knife blade subassembly so that the device will not seal against pressure in the event the knife blade subassembly is inadvertently omitted.

U.S. Pat. No. 3,693,691 entitled "Pressure Relief Device" was issued Sept. 26, 1972 to Stanley Summers. That device provides a device particularly suited for use with aircraft wheels or similar wheel bearing tires which are inflated with a gas from a source that is at a pressure that exceeds the safety limits of the wheel.

Many of the above devices require complex manufacturing as they include a number of complex interconnecting parts, ridges, shoulders, and the like. These devices are highly complex, expensive to manufacture and to machine and are generally costly. Further, many of these devices provide cutting blades which can, in fact, support the disk during reverse-buckling rather than cut the disk, causing malfunction. For example, many of the knife blades used in such reverse-buckling disks are a plurality of knife blades which, upon reversal, cut the disk into radial sections such as quarters. Some of these knife blades require finely honed edges in order to function properly. Corrosion, for example, can severely limit proper operation of such a rupture disk. Another problem with rupture disks is the problem of a full opening of the disk upon rupture. This problem can be particularly acute at low pressures.

GENERAL DISCUSSION OF THE PRESENT INVENTION

The present invention provides a rupture disk assembly of the reverse-buckling, knife blade type. A housing defines a bore for conveying flow. A frangible, concave-convex disk is supported at its edge portions by the housing so that the bore is closed by the disk. The disk resists pressure on the convex side until a pre-determined pressure is reached. An elongated knife blade having two end portions is positioned within the bore on the concave side of the disk. The ends of the knife blade are attached to the inner surface of the housing. Both ends are preferably attached to the housing on one side of the lateral center line of the bore. This connection is preferably at two separate positions on the housing inner surface. The knife blade can be generally U-shaped when viewed longitudinally along the bore axis. A plurality of teeth with sharp cutting edges are preferably disposed along the edge of the knife blade which faces the disk so that when the disk reverses, it contacts the blade and is cut.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 1 is a top view of the preferred embodiment of the apparatus of the present invention;

FIG. 2 is a sectional view taken along lines 2—2 of FIG. 1;

FIG. 3 is a sectional view of the preferred embodiment of the apparatus of the present invention illustrating operation of the device; and FIG. 4 is an exploded disassembled view of the preferred embodiment of the apparatus of the present invention.

DETAILED DESCRIPTION OF THE PRESENT INVENTION

FIGS. 1-4 illustrate the preferred embodiment of the apparatus of the present invention designated generally by the numeral 10.

Reverse-buckling rupture disk 10 comprises an annular preferably cylindrical housing 12 having an inner bore 13 for conveying flow, defined by interior wall 14 of housing 12. Housing 12 provides a pair of annular wall sections 20, 22 which are joined at weld 26. A rupture disk 30 of the frangible, reverse-buckling type is provided with its annular edge being a flange 34 which is sandwiched between sections 20, 22 upon assembly. Disk 30 could be, for example, of thin metallic construction such as stainless steel. It should be understood that when housing sections 20, 22 are assembled and weld 26 made, all three elements including section 20, disk 30 and section 22 are fused together by weld 26.

Reverse-buckling rupture disk 30 includes a convex surface 31 and a concave surface 32. Arrow 35 in FIGS. 2 and 3 illustrate the direction of flow through bore 13.

Mounted downstream of concave face 32 of reverse-buckling disk 30 is knife blade assembly 40. Knife blade assembly 40 is generally curved and elongated, having a U-shape, the blade being attached at its end portions 42, 44 to the inner surface 14 of housing 12. Both ends 42, 44 of blade 40 are preferably connected to the inner surface 14 of the housing bore 13 and on one side of the lateral center line of the bore (see FIG. 1).

In FIG. 3, disk 30 is shown after rupture, having reversed and buckled and having been cut by blade 40. This releases pressure from a vessel 50 with which the disk assembly 10 is being used. Flow to relieve pressure can then exit the vessel, leaving through bore 13 of housing 12 as shown by arrow 35. Blade ends 42, 44 preferably connect to surface 14 at different points around the inner surface 14 of housing 12.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A rupture disk assembly comprising:
  a. a cylindrical housing with an inner cylindrical wall defining a central bore for conveying flow;
  b. a frangible concave-convex disk supported at its edge portions by the housing, closing the bore, the disk being designed to resist pressure on the convex side up to a predetermined pressure and then collapsing after the predetermined pressure is reached; and
  c. an elongated U-shaped knife blade comprising a flat blade body with an upstream leading edge and a downstream trailing edge that are spaced from the wall of the bore and a plurality of serrated teeth lining the leading edge, for perforating the disk when it collapses, the ends of the blade being connected to the inner surface of the housing means downstream of the disk.

2. The disk of claim 1, wherein both ends of the knife blade are connected directly to the inner surface of the housing wall on one side of the lateral center line of the bore.

3. The disk of claim 2, wherein the ends of the knife blade are connected at different points radially spaced around the inner surface of the housing.

4. The disk of claim 2, wherein the knife blade is U-shaped and includes a curved section that extends across the lateral center line toward the opposite surface of the bore from where the ends are connected to the housing inner wall.

5. The disk of claim 1, wherein the knife blade includes a plurality of teeth with sharp edges pointed in the direction of the disk.

6. The disk of claim 5, wherein the sharp edges are positioned directly beneath and spaced downstream the concave surface of the disk.

7. A rupture disk assembly, comprising
  a. a two-part housing including a pair of hollow cylindrical sections including an upstream section and a downstream section, with a bore for conveying flow therethrough;
  b. a frangible concave-convex disk connected along its peripheral edge to the housing, between the two housing sections closing the bore, the disk being designed to resist pressure on the convex side up to a predetermined pressure and then collapsing after the predetermined pressure is reached; and
  c. an elongated U-shaped knife blade with two ends positioned within the bore on the concave side of the disk and spaced downstream therefrom, the blade comprising a flat blade body with an upstream leading edge and a downstream trailing edge that are spaced from the wall of the bore and a plurality of teeth lining the leading edge, for perforating the disk when it collapses, both ends of the blade being connected to the downstream housing section on one side of the lateral center line of the bore.

8. The disk of claim 7, wherein the knife blade is U-shaped and extends across the lateral center line toward the opposite side of the bore from where the ends are connected.

9. The disk of claim 7, wherein the knife blade includes a plurality of teeth with sharp edges pointed in the direction of the disk.

10. The disk of claim 9, wherein the sharp edges are positioned directly beneath the concave surface of the disk.

* * * * *